April 3, 1962   R. F. HUGHES ET AL   3,028,168
CHUCK FOR LATHES, DRILLS AND THE LIKE
Filed Sept. 4, 1959
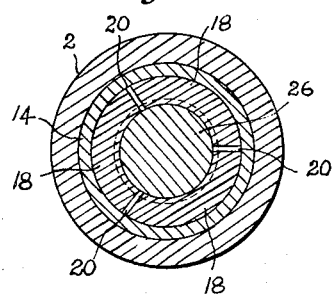
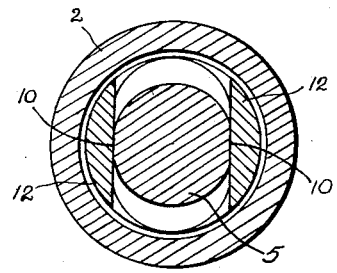
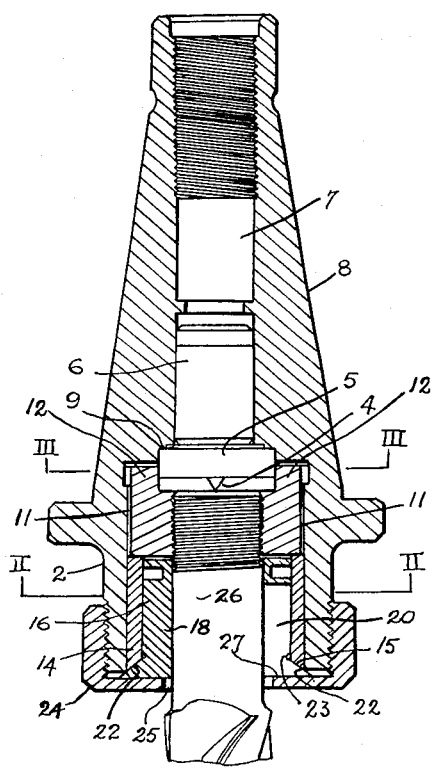

United States Patent Office 3,028,168
Patented Apr. 3, 1962

3,028,168
CHUCK FOR LATHES, DRILLS AND THE LIKE
Roderick Fred Hughes, Sheffield, and Bernard Smith, Hinckley, England, assignors to Samuel Osborn & Company Limited, Sheffield, England, a company of Great Britain and Northern Ireland
Filed Sept. 4, 1959, Ser. No. 838,335
4 Claims. (Cl. 279—57)

This invention relates to an improved chuck for lathes, drills and the like. It deals more particularly with a chuck or tool holder in which a thread in said chuck is engaged by a threaded end portion on the shank of the milling cutter, drill or other tool to be held, the gripping action of said chuck being provided by a split collet, a conical surface on the collet co-operating with a conical surface in the chuck to contract the collet onto the shank.

It is an object of the present invention to provide a chuck in which there is substantially no longitudinal movement of the collet in the chuck body thereby obtaining a better grip on the tool shank.

It is a further object of the invention to form the collet limit stop as an end cap to the chuck body thereby facilitating removal of the parts for cleaning and repair.

Now referring to the drawings:

FIG. 1 is a sectional elevation of a chuck constructed according to the present invention.

FIG. 2 is a true section taken on the line II—II of FIG. 1.

FIG. 3 is a true section taken on the line III—III of FIG. 1.

When the cap 24 has been screwed home on the body 2 and before the tool 26 has been inserted, the collar 11 and sleeve 14 are free to slide for a short distance in the body 2 and the collet 18 has likewise a limited degree of free sliding movement in the sleeve 14.

In the embodiment of the invention shown in the drawings the chuck has a hollow cylindrical tool-receiving body 2 at the inner end of which is a limit stop 4, formed on the head 5 of a center 6 inserted into the guide bore 7 of the tapered shank 8 of the chuck. The head 5 engages an annular shoulder 9 at the inner end of the body 2 and has two opposed flats 10 (FIG. 3) to prevent rotation of the center relative to the body 2.

An internally threaded collar 11 having two internal flats cut into one end to form two projecting lugs 12 is axially slidable in the body 2 and the lugs 12 engage over the flats 10 on the head 5 of the center 6. A sleeve 14, also a sliding fit in the body 2, abuts the outer end face of the collar 11, the outer end of the sleeve 14 having an internally coned surface 15. The sleeve 14 embraces a tool shank receiving collet 16 having three partially separated segments 18 formed by slits 20 (FIG. 2) extending for the greater part of the length of the collet. The outer end of each segment 18 is enlarged to form a conical surface 22 matching the coned surface 15 of the sleeve 14, and preventing the collet from sliding into the chuck to abut the collar 11 from which it is thus spaced. A shallow annular groove 23 is cut in the collet at the junction of its cylindrical and conical surfaces and this prevents the collet from binding in the sleeve 14. The tool-receiving end of the chuck is completed by a cap 24 screwed onto the outside of the body 2 the cap having a central hole 25 therein to allow the shank 26 of a tool to be inserted. The internal surface 27 of the end face of said cap is a hardened face for supporting the collet 16 at its outer end.

In operation the shank 26 of the drill or cutter is inserted into the chuck and screwed into the internally threaded collar 11 until it abuts the limit stop 4. Further rotation of the shank will tend to draw the collar 11 out of the body 2, and this axial movement is transmitted to the sleeve 14 which in turn will, by co-action between the conical surfaces 15, 22, exert a radial movement inwardly on the segments 18 of the collet forcing them into intimate gripping contact with the shank 26 of the drill or cutter.

As will be seen the lugs 12 on the collar 11 and the flats 10 on the head 5 are of large proportions which ensures adequate strength and gripping force.

The large head 5 seating against the shoulder 9 prevents either pushing back or shearing of said head.

It is to be understood that the improved chuck may be modified in a way that is obvious to anyone skilled in the art, and that the scope of the invention is not to be limited to the embodiment disclosed.

What we claim and desire to secure by Letters Patent is:

1. A chuck having a tool receiving collet provided with an external coned surface, a sleeve slidably carried on said collet having a matching internal coned surface, a tool-shank-receiving collar threaded internally to receive the threaded shank of a tool, said collar engaging said sleeve when said conical surfaces are engaged, and a tool body having a bore to slidingly receive said collar and sleeve, means on said body for preventing rotation of said collar and limit stops on said body to limit the inward movement of said tool shank and the outward movement of said collet, the tightening of said collet on the tool shank being effected by axial movement of said sleeve effected by the axial movement of said collar.

2. A chuck according to claim 1, wherein said limit stop for the collet is formed as an end cap to the tool body, said end cap having a flat inner face and said split collet extends beyond the sleeve to abut the inner face of said cap.

3. A chuck according to claim 1, wherein said internally coned surface is outwardly flared to have its greatest diameter at the open end of the body member.

4. A chuck according to claim 1, wherein said limit stop for the tool shank is formed on a center inserted in the bore of the chuck.

References Cited in the file of this patent

UNITED STATES PATENTS

| 1,701,172 | Brown | Feb. 5, 1929 |

FOREIGN PATENTS

| 217,345 | Australia | Sept. 9, 1958 |
| 551,065 | Great Britain | Feb. 5, 1943 |
| 962,845 | Germany | Apr. 25, 1957 |